Figure 1:
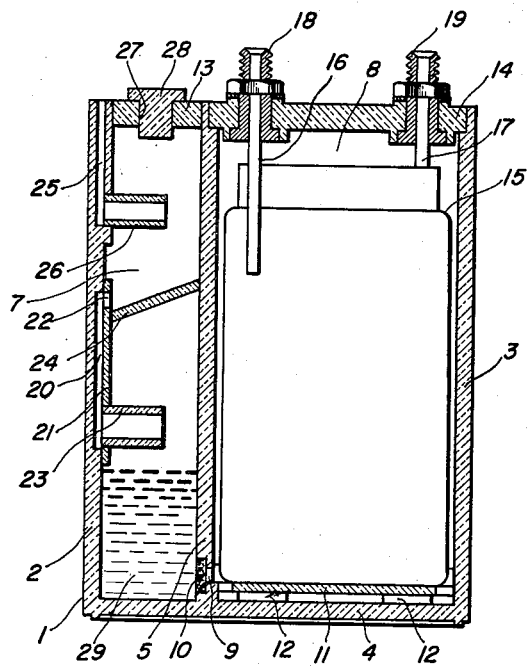

Aug. 6, 1963     C. L. C. CHAPMAN     3,100,165
ELECTRIC BATTERIES
Filed Sept. 27, 1960

INVENTOR:
CHRISTOPHER L.C. CHAPMAN
BY
AGENT

United States Patent Office 3,100,165
Patented Aug. 6, 1963

3,100,165
ELECTRIC BATTERIES
Christopher L. C. Chapman, Sutton, England, assignor to Yardney International Corp., New York, N.Y., a corporation of New York
Filed Sept. 27, 1960, Ser. No. 58,807
8 Claims. (Cl. 136—177)

This invention relates to an electric cell or battery assembly. More particularly, the invention relates to an electrochemical cell in which gases formed within the cell structure can be led out of the structure into the atmosphere while at the same time preventing the entrance of atmospheric oxygen or other contaminants from the atmosphere.

The invention will be described in its application to a silver/zinc cell with alkaline electrolyte for the sake of simplicity. However, it is to be understood that the invention is applicable to any cell in which gases form within the assembly.

In its best known form the silver/zinc cell usually comprises positive plates of silver, negative plates of zinc oxide or zinc oxide and zinc and separators of, for example, regenerated cellulose. The plates and separators can be combined together in a number of ways, for example separators of regenerated cellulose can be formed into bags each containing a positive or negative plate. The amount of electrolyte, for example, potassium hydroxide, used in the cell is normally limited to a small excess over what is absorbed by the plate and separator system since free electrolyte in the cell contains zinc in solution which may be deposited as metallic zinc leading to possible short circuits by "treeing."

Silver zinc cells usually show a progressive decrease in capacity during use which decrease does not follow a well defined pattern even with cells of similar type and construction. In some cases the loss of capacity is fairly rapid and in other cases it takes place more slowly.

It has been established that both positive and negative plates removed from cells, the capacities of which have dropped to a fraction of their original capacities during protracted cycling, are still capable of producing capacities equivalent or nearly equivalent to their original level and this is, in turn, closely related to the electrochemical capacity of the quantities of material used.

This is particularly true in the case of positive plates but not quite so in the case of negative plates since some zinc is lost from the negative plates by dissolution in the electrolyte. In these circumstances it is clear that some other major factor is responsible for the capacity loss and it has been found that the effect of atmospheric oxygen on the negative plate is many times in excess of what had previously been believed.

Although other possibilities exist it may be that the following reaction occurs in the cell $$O_2 + 2Zn + 2H_2O \rightarrow 2Zn(OH)_2$$

If this reaction does occur it will be seen that the negative plate undergoes what is, in effect, a continuous discharge and over a period of time the result is that the positive and negative plates become unbalanced with respect to each other in terms of state of charge. Since the attainment of full charge in a silver/zinc cell is judged by a voltage indication from the positive plate the charge input will always be determined by this. However as suggested above the negative plate appears to suffer what is in effect a continuous discharge in addition to the discharge represented by normal use so that after a number of cycles the position arises that in a comparatively fully charged battery the negative plate is actually partially charged and the effective capacity is limited.

The undesired access of atmospheric oxygen to the negative plates could be completely prevented by sealing the cell but such a solution entails practical difficulties since it necessitates restrictions in use in order to avoid the production of high pressures within the cell. It is well known to provide excess negative capacity which allows oxygen evolved from the positive plate to be recombined or absorbed but should hydrogen be evolved, which can be the case in certain circumstances, then excess pressure may cause rupturing of the battery case. Thus, sealed cells are usually fitted with a safety device such as bursting discs to overcome this difficulty.

It is known to work a cell with a sufficiently high electrolyte level to ensure that the negative plates are completely covered but this increases the likelihood of "treeing" resulting from deposition of soluble plate material. Furthermore there is evidence that oxygen from the atmosphere can be absorbed by the electrolyte and so gain access to the negative plates and also, with an alkaline electrolyte, atmospheric carbon dioxide combines with the potassium hydroxide electrolyte to form carbonate and water according to the following reaction $$2KOH + CO_2 \rightarrow K_2CO_3 + H_2O$$

This reaction is undesirable in an alkaline cell and normally requires a complete change of the electrolyte at specified intervals.

Access of atmosphree to within the cell might be prevented by valve systems but such arrangements are difficult to design for reliable operation.

It is therefore a primary object of the present invention to provide an electrochemical cell which can vent gases that are built up within the cell structure to the atmosphere while at the same time preventing the entrance of atmospheric oxygen or other contaminants from the atmosphere into the cell assembly.

It is another object of the invention to provide a cell casing which contains a device to permit discharge of gases therefrom while preventing entrance thereto of any atmospheric oxygen or other contaminant.

It is still another object of the invention to provide an electrochemical cell having a compartmented casing in which the compartments communicate with each other through an orifice that is sealed with liquid.

Figure 2:
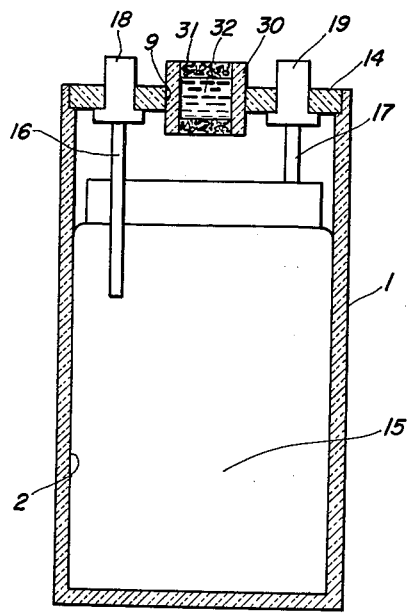

Other objects and advantages of the invention will be apparent from the following description and the accompanying drawing in which:

FIG. 1 shows a partial section of an electrochemical cell constructed in accordance with the invention; and FIG. 2 a partial section of an electrochemical cell showing a simplified variation of the invention.

Referring to FIG. 1 a battery casing made of plastic or other suitable material indicated generally at 1 comprises opposed end walls 2 and 3, opposed side walls (not shown), a bottom 4 and a dividing wall 5 which extends between the side walls and divides the interior of the casing into a first compartment 7 and a second compartment 8. Adjacent its lower end, the dividing wall 5 is formed with an orifice 9 closed by a plug 10 of microporous material such as microporous polyvinyl chloride or polyethylene which is readily permeable to gases but allows liquid to pass more slowly.

A slatted platform 11 is disposed within the compartment 8 and is supported in spaced relationship from the base 4 on pillars 12. The upper ends of the compartment are closed by lids 13 and 14.

An electrode assembly 15 comprising a plurality of positive silver and negative zinc or zinc and zinc oxide plates and appropriate separators is disposed within the second compartment 8 and its lower end is supported on the platform 11. The electrode assembly can take any suitable form but it is essential that access can be gained between the plates and separators from the lower ends thereof. Terminal leads 16 and 17 for the assembly are electrically connected respectively to terminals 18 and 19 passing in a fluid tight manner through apertures formed in the lid 14.

Compartment 7 of casing 1 is subdivded into two sections by a barrier 24 which extends between dividing wall 5 and plate 21 which forms the inner wall of channel 20. The outer wall of channel 20 is formed by end wall 2. The channel 20 communicates with the upper section of compartment 7 through aperture 22 and with the lower section of compartment 7 through trap-vent 23 which extends transversely part way across the lower section of compartment 7.

The upper part of end-wall 2 also forms a channel 25 the upper end of which communicates externally of the casing and the lower end of which communicates with one end of a trap vent 26 which extends transversely partly across the upper section of the compartment 7. An aperture 27 formed in the lid 13 is closed by a plug 28.

A quantity of electrolyte 29 is disposed in the bottom of the casing 1 through the aperture 27 and is sufficient to mask the upper part of the orifice 9 in the dividing wall 5. In normal conditions of working a slight bias of gas pressure will be built up in the second compartment 8 so as to raise the level of that part of the electrolyte in the first compartment 7. As pressure conditions build up in the second compartment 8 the electrolyte level therein is lowered to the level of the top of the orifice 9 when any excess gas would escape through the orifice 9 through the electrolyte in the first compartment 7 and would escape to atmosphere. However, it will be appreciated that that part of the electrolyte maintained within the first compartment 7 constitutes a barrier between the atmosphere and the electrode assembly 15. Furthermore, since the lower part of the electrode assembly 15 is always bathed by electrolyte, capillary action ensures that sufficient electrolyte penetrates between the plate of the assembly for efficient operation of the battery.

It will be appreciated that the system of vents and barrier within the first compartment 7 is provided to ensure that the battery will not lose its reserve of electrolyte should it be displaced from its upright position and will continue to operate efficiently so long as any such displacement is temporary as an alternative embodiment. The channel 25 and the trap vent 26 could be eliminated and a filler cap or "inverted ink well" form can be used in place of the plug 28.

In conditions where no displacement of the battery is likely to occur the vent and barrier system can be omitted and the plug 28 replaced by a vented filler cap.

With a battery according to the invention the removal of the reaction associated with contact of the negative plates with atmospheric oxygen enables the reaction to become almost completely reversible, the electrolyte taking no active part according to the accepted formula:

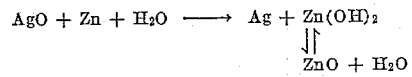

and it has been found that a silver/zinc battery constructed as described above maintains its capacity substantially constant throughout many cycles of operation.

Due to the absence of any considerable quantity of free electrolyte in the plate system zinc in solution is very small and, therefore, the deposition of metallic zinc is almost completely eliminated. Deposition of zinc has in the past been a critical factor in the silver/zinc cell, largely responsible for its inability to withstand overcharging. In the present design overcharging can be carried on without damage resulting. Indication of full charge is shown by vigorous gassing through the electrolyte pool which is a simpler form of control than measuring the terminal voltage which was previously used. The advantages of this can easily be appreciated when it is understood that a battery consisting of a large number of cells can be charged until the onset of gassing and the charge terminated.

In a modification of the construction of FIG. 1 the lower end of the electrode system 15 is disposed at a level above the upper part of the orifice 9 and to energize the battery sufficient electrolyte 29 is added to wet this lower end and cause the electrolyte to pass within the electrode system by capillary action and after the build up of pressure conditions in the second compartment 8 as described above a gap exists between the lower end of the electrode system 15 and the free electrolyte in the lower part of the second compartment 8. Furthermore it will be appreciated that this electrolyte together with that quantity in the first compartment 7 constitutes a liquid seal. If desired, a quantity of an additional fairly viscous liquid, non miscible with the electrolyte and of lesser specific gravity than the electrolyte may be supported on the pool within the first compartment 7. The additional liquid may, for example, comprise an oil.

In an alternative arrangement the electrode system shown in FIG. 1 may be energised by the addition of electrolyte 29 until sufficient of the latter has passed into the electrode system 15 by capillary action when the surplus is then removed and a quantity of a fairly viscous liquid, non miscible with the electrolyte is added to the first compartment 7 to mask the orifice 9 and constitute a liquid seal.

Although the arrangements described above constitute preferred constructions some of the advantages of the invention may be obtained with a much simpler construction. One example of a simplified form of the invention is shown in FIG. 2 in which a conventional battery casing 1 incorporates an electrode system 15 within a single compartment 2. Electrical connections 16 and 17 to the outermost plates of the system are connected with terminals 18 and 19 passing through apertures in the lid 14. In the place of the central vent plug a member 30, generally a tube or the like, is disposed within an orifice 9 in the lid 14. The upper and lower ends of the member 30 are closed by microporous material 31 and the interior of the member filled with a liquid 32. In such a construction assuming the casing to contain sufficient electrolyte satisfactorily to wet the electrode system but insufficient to cover the plates with free electrolyte, gases accumulating in the upper part of the casing during use are able to pass through the lower microporous closure 31, bubble through the liquid 32 and thence escape through the upper closure 31 to the atmosphere, whereas owing to the slight excess of pressure within the casing over atmospheric pressure no ingress of gases through member 30 will occur.

A cell constructed in accordance with the practice of the instant invention presents many advantages. For example, the cell is extremely efficient in operation since a balanced charge between the negative and positive electrodes is maintained at all times and atmospheric oxygen and other contaminants are prevented from entering the interior of the cell. As a result, the capacity loss of the cell is reduced in cycling. Furthermore, gases which are formed within the cell are easily vented to the outside thereby preventing a pressure bulid-up within the cell casing which could result in explosion. Numerous other advantages of this invention will be readily apparent to those skilled in the art.

It is to be understood that the invention is not to be limited except as defined in the appended claims and many modifications and embodiments of the invention may be made without departing from the spirit and scope thereof.

I claim:

1. An electrochemical cell comprising in combination a casing, said casing divided into a first electrolyte-containing compartment and a second electrolyte-containing compartment, said first compartment being subdivided into upper and lower sections by a transverse member, a trap vent in said lower section opening into a vertically extending channel communicating with said upper section and a trap vent in said upper section, communicating with a second vertical channel opening externally of said casing thereby permitting communication of said first compartment externally of said casing, said second compartment communicating with said first compartment through an orifice located at a level below the external opening of said first compartment, an electrode assembly positioned in said second compartment and a sufficient quantity of electrolyte in said first compartment to mask said orifice and thereby provide a liquid seal between said compartments, said electrolyte in said first compartment being in communication with electrolyte in said second compartment through said orifice and subject to variation in level in response to gas pressure developed in said second compartment whereby there is movement of electrolyte between the two compartments and irrigation of said electrode assembly.

2. An electrochemical cell as defined in claim 1 wherein the electrode assembly contains positive plates consisting essentially of silver and negative plates consisting essentially of zinc.

3. An electrochemical cell as defined in claim 2 wherein the electrolyte is an alkaline solution.

4. An electrochemical cell as defined in claim 3 wherein the electrolyte is potassium hydroxide.

5. An electrochemical cell comprising in combination a casing, said casing divided into a first electrolyte-containing compartment and a second electrolyte-containing compartment, said first compartment being subdivided into upper and lower sections by a transverse member, a trap vent in said lower section opening into a vertically extending channel comunicating with said upper section and a trap vent in said upper section communicating with a second vertical channel opening externally of said casing thereby permitting communication of said first compartment with an environment external to said casing, said second compartment communicating with said first compartment through an orifice fitted with a plug of microporous material pervious to an electrolyte solution and to gases formed within said casing and located at a level below the external opening of said first compartment, an electrode assembly containing positive plates consisting essentially of silver and negative plates consisting essentially of zinc positioned in said second compartment and a sufficient quantity of electrolyte in said first compartment to mask said orifice and thereby provide a liquid seal between said compartments and prevent direct communication of said second compartment with the environment external to said casing, said electrolyte in said first compartment being in communication with electrolyte in said second compartment through said orifice and subject to variation in level in response to gas pressure developed in said second compartment whereby there is movement of electrolyte between the two compartments and irrigation of said electrode assembly.

6. An electrochemical cell as defined in claim 5 wherein the microporous material is polyvinyl chloride.

7. An electrochemical cell as defined in claim 5 wherein the electrolyte is potassium hydroxide.

8. An electrochemical cell as defined in claim 6 wherein the microporous material is polyethylene.

References Cited in the file of this patent

UNITED STATES PATENTS

| 2,055,645 | Allen | Sept. 29, 1936 |
| 2,565,674 | Zachlin | Aug. 28, 1951 |

FOREIGN PATENTS

| 111,406 | Germany | June 18, 1900 |
| 538,129 | France | Mar. 14, 1922 |